Aug. 8, 1933.  W. D. BURTON  1,920,956
POWER TRANSMISSION MECHANISM
Filed May 1, 1931
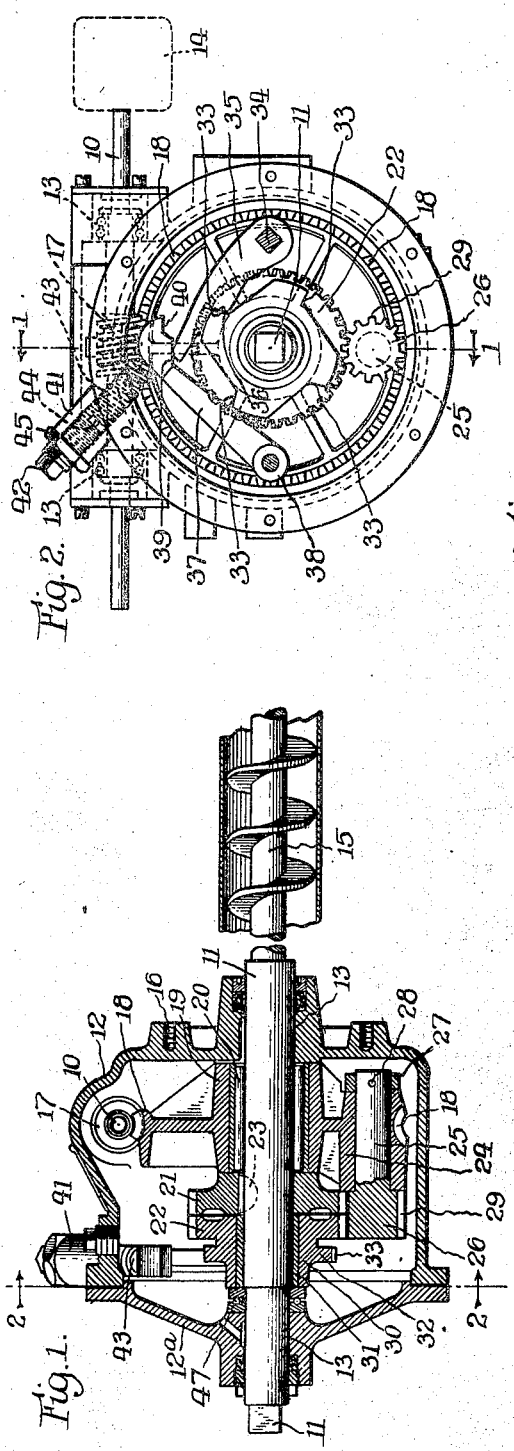
Inventor:
Warren D. Burton,
By Chindahl, Parker & Carlson
Attys.

Patented Aug. 8, 1933

1,920,956

UNITED STATES PATENT OFFICE 1,920,956

POWER TRANSMISSION MECHANISM

Warren Dean Burton, Goshen, Ind., assignor to Combustioneer, Inc., Goshen, Ind., a Corporation of Illinois Application May 1, 1931. Serial No. 534,244

3 Claims. (Cl. 74—34)

The present invention relates to improvements in power transmission mechanisms of the type which are effective to disconnect the drive to a driven part in the event of an excessive load.

The invention is particularly adapted for use in mechanical stokers in which fuel is fed by a power driven screw conveyer from a hopper through a conveyer duct into a retort or furnace. The fuel supplied to the hopper often contains foreign objects, such as pieces of iron, steel or rock, which will not crush. Frequently, such objects form obstructions at the outlet of the hopper, thereby clogging the apparatus. In this event, if the drive for the screw conveyer is not disconnected, serious damage to the apparatus may result.

To avoid the possibility of such damage, it is common to interpose a member in the drive for the screw conveyer which will shear when subjected to a force somewhat in excess of the force required in normal operation, and which can be readily replaced. If an obstruction in the hopper causes a break down in the operation, obviously, the obstruction must be removed and a new shear member must be provided before the operation can be started again. This involves inconvenience and often a considerable loss of time.

The primary object of the present invention is to provide an improved power transmission mechanism which embodies a novel disconnecting means arranged to open automatically when the mechanism is subjected to a load in excess of a predetermined maximum. Thus, if connected to the screw conveyer of a stoker, the mechanism would constitute a safety cut-out device operable to disengage the power drive if an obstruction in the fuel should bind the conveyer against rotation or subject same to a force substantially in excess of the normal operating force.

Another object of the invention is to provide, in a transmission mechanism of this character, novel means for maintaining the mechanism in disengaged condition until manually reset once it has been automatically released.

A further object of the invention is to provide a transmission disconnecting mechanism which includes a normally stationary member forming a part of the transmission, and means for holding said member stationary, said means being shiftable by an excess load to release said member for movement and thereby to disconnect the mechanism.

More particularly stated, an object resides in the provision of a transmission mechanism embodying a pair of coaxial and relatively rotatable gears, one of which is normally stationary and the other of which is secured to the driven member, driving means common to said gears for producing relative rotation therebetween, and means arranged normally to hold said gear stationary and to release the gear for movement when an excess load is placed on the mechanism.

A general object of the invention resides in the provision of a novel power transmission mechanism of the foregoing character which is simple, compact and inexpensive in construction, which is efficient, sensitive and reliable in operation, which is adjustable to open at different loads, and which when subjected to a predetermined load will open readily.

Further objects and advantages will become apparent as the description proceeds.

In the accompanying drawing, Figure 1 is a vertical, axial section through a device embodying the features of the invention, as indicated by the line 1—1 of Fig. 2.

Fig. 2 is a transverse section taken along the line 2—2 of Fig. 1.

Fig. 3 is an inside face view of the cover element.

Fig. 4 is an end elevation looking at the left-hand end of the device as shown in Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the mechanism constituting the exemplary embodiment of the invention comprises generally a driving shaft 10 and a driven shaft 11, each of which extends into a transmission enclosing housing 12 of suitable size and shape. The housing in this instance is sectional, with one of said sections, designated 12ª, constituting a separable cover permitting access to the interior of the housing. The shafts are preferably journalled in suitable bearings 13 in the walls of the housing and are disposed in spaced relation and at substantially right angles to each other. The driven shaft preferably extends axially of the housing and cover sections.

The driving shaft 10, externally of the housing, is connected with a prime mover of any well-known type, such as an electric motor generally indicated at 14. One end of the driven shaft 11, herein shown in Fig. 1 as the right-hand end, is adapted for connection to a machine part, such as the screw conveyer 15 of an underfeed stoker. Generally, when the device is used in this particular connection, the mechanism is supported upon the fuel supply hopper (not shown) of the stoker, and for this purpose tapped bores 16 in the housing 12 may be provided.

The driving connection between the two shafts 10 and 11 in this embodiment comprises a worm 17 rigidly secured to the driving shaft and arranged to mesh with a worm wheel or gear 18 on the driven shaft 11. The worm gear is capable of rotation relative to the shaft 11 and to this end embodies an axial hub 19 mounting a sleeve bearing 20 through which the shaft extends.

While a reduction of speed is effected by the worm and worm gear, such reduction is generally insufficient. A still greater reduction of speed is, therefore, provided in the following manner. The shaft 11, adjacent the end of the hub 19 opposite the integral end wall of the housing, carries a pair of gears 21 and 22 disposed side by side thereon. One of the gears (in this instance the gear 21 next adjacent the worm gear hub 19) is affixed, as by a key 23, to the shaft 11, the other gear 22 being capable of rotation relative to the shaft. The gears 21 and 22 are substantially the same except that one of the gears (herein the gear 22) has a lessor number of teeth than the other gear 21. This difference, for example, may be of one, two, or three teeth, it being understood that the speed reduction ratio is determined by said difference.

The worm gear, near the periphery thereof, is fashioned to provide a tubular boss 24, the axis of which parallels the axis of the shaft 11. The boss has a stub shaft 25 journalled therein and held against relative axial displacement by an enlarged head 26 formed on one end of the stub shaft and a collar 27 secured by a pin 28 to the other end. The head end of the shaft overlies the peripheral faces of the gears 21, 22 so that gear teeth 29 on the peripheral face of the head 26 may engage both of said gears and constitute, what will be hereinafter termed, a pinion common to both gears.

The above described construction corresponds to one form of planetary gear system, the operation of which is believed to be well-understood. Thus, presuming that the worm 17 is driven in a counter-clockwise direction (Fig. 1) to rotate the worm 18 counterclockwise (Fig. 2), the pinion will describe a circumferential path in the same direction about the peripheries of the gears 21, 22. If the gear 22 (which, it will be remembered, is rotatable relative to the shaft 11) is held stationary, the common engagement of the pinion with the different numbers of teeth on the two gears will cause rotation of the gear 21 and shaft 11 in a counterclockwise direction and at a greatly reduced speed.

It will be evident that, as the pinion drives the gear 21 in a counterclockwise direction, the pinion must exert a force on the stationary gear 22 which is substantially equal to the exerted driving force but which tends to rotate the gear 22 in an opposite or clockwise direction. Therefore, by providing means for holding the gear 22 stationary, or against rotation, which means is arranged to release said gear for rotation when the device is subjected to a predetermined maximum load in excess of the normal operating load, the driving mechanism may be instantly disconnected when such a load is encountered. This is due to the fact that the gear 22 is freely rotatable (unless it is held against such movement) while the gear 21 is fixed to the load-carrying shaft 11. Hence, upon release of the gear 22, the gear 21 is held stationary by the load thereon and the gear 22 becomes the driven gear.

In one preferred form, the mechanism for accomplishing this purpose comprises the following arrangement of parts. The gear 22 has an elongated hub member 30 (Fig. 1) by which the gear is mounted on the shaft 11. An interposed sleeve bearing 31 facilitates relative rotation between the parts. The hub extends from one side of the gear 22 toward the cover 12ᵃ and has an integrally formed, annular flange 32 thereon. At spaced intervals, the flange 32 is recessed or cut-away to provide a plurality of circumferentially spaced shoulders or lugs 33. The shoulders face in the direction toward which the gear 22 has a tendency to be driven in the operation of the device.

The cover 12ᵃ is conventionally fashioned to provide a journal for a short rock shaft 34 (Figs. 2, 3 and 4) which extends through the cover. The end of the shaft within the casing is squared or otherwise suitably fashioned rigidly to receive one end of an arm or pawl 35. The arm 35 extends from the shaft 34 in a direction opposite to that toward which the shoulders 33 face, and has an abutment 36 formed thereon for engagement with any one of the shoulders 33. As may be seen clearly in Fig. 2, the faces on the shoulders 33 have a slight slope rearwardly with respect to the direction in which they tend to move, and the shoulders 33 and abutment 36 are the complements of each other. As a result, engagement between the shoulder 33 and the shoulder 36 holds the gear 22 against rotation, the engagement, however, being releasable due to the slope of the meeting faces of the parts.

Means is provided for holding a shoulder 33 and the abutment 36 in engaged relation under normal operating conditions and for releasing such engagement when a load in excess of a predetermined limit is imposed. Moreover, the means is adapted to hold the parts in disengaged relation once the connection has been opened. In the present instance, this means comprises a lever 37 supported for pivotal movement on a boss 38 rigid with the cover 12ᵃ and preferably located on the side thereof diametrically opposite the rock shaft 34. The lever 37 extends toward and past the end of the arm 35 and, substantially at the point where the end of the arm meets the lever when the shoulders 33 and 36 are engaged, the adjacent side edge of the lever is recessed to provide a face 39 (Figs. 2 and 3). The face 39 normally overlies the end of the arm, as shown in Fig. 2, to hold a shoulder 33 and the abutment 36 engaged. However, the face engaging portion of the arm is preferably rounded and the angular relation of the face 39 thereto is such that the arm may move out of engagement with the face by moving the lever 37 about its pivot. Intermediate the face 39 and the free end of the lever, is a shallow notch 40 fashioned to receive and hold the end of the arm after it has moved out of engagement with the face 39.

The lever 37 is yieldably urged into engagement with the arm 35 by means which is adjustable to vary the exerted force. Thus, the casing 12 has an appropriately positioned tubular boss 41 opening into the casing toward the free end of the lever 37. The outer end of the boss is internally screw-threaded to receive a plug 42 and a helical spring 43 is interposed between the plug and the lever. Short pins 44 on the plug and lever provide seats for the spring. By screwing the plug into or out of the boss, the tension of the spring may be adjusted, and the adjustment may be maintained by such means as a lock nut 45 on the plug.

In operation, presuming that the parts occupy the position shown in Fig. 2, it will be seen that the gear 22 is held stationary by the engagement of the abutment 36 on the arm 35 with one of the shoulders 33 on the annular flange 32. This engagement is maintained by the interlatched relationship of the face 39 on the lever 37 with the end of the arm 35. The tension of the spring 43 would, of course, be previously adjusted to exert a predetermined force for holding the parts in their interlatched relationship. This force is greater than that force necessary to hold the parts interlatched under normal operating conditions. If a driving force is now applied to the shaft 10, the driven rotation of the worm gear 18 carries the pinion about the gears 21 and 22 to effect a driven movement of the gear 21 and thereby of the shaft 11.

Under normal operating conditions, the device will function in this manner. Should an excessive load be imposed on the shaft 11, as would result upon material becoming jammed in the screw conveyer 15, there is a greater tendency for the gear 22 to be driven in a reverse direction. This obviously will impose an additional load upon the interlatched parts which hold the gear 22 stationary, whereupon the abutment 36 will be forced out of engagement with the shoulder 33, by movement of the lever 37 against the tension of the spring 43, and the end of the arm 35 will enter the notch 40. The drive is now disconnected since the abutment 36 is held out of engagement with any of the shoulders 33 so that the gear 22 is idly driven while the gear 21 is stationary.

When the mechanism has once become automatically disengaged, it must be manually reset after the obstruction, or other difficulty which produced the excess load, has been removed or eliminated. For this purpose, the rock shaft 34, exteriorly of the housing, carries a handle 46 rigidly secured thereto, by which the operator is able to swing the end of the arm 35 out of engagement with the notch 40 to permit of a re-engagement of the abutment 36 with one of the shoulders 33.

As has been mentioned, the relationship of the driven shaft 11 to the two sections 12 and 12ª of the housing is such that the shaft extends substantially axially of the open face of the section 12 which is normally closed by the cover element 12ª. In the preferred arrangement of parts, as may be seen in Fig. 1, one of the bearings 13 for the shaft 11 is formed in the cover section 12ª so that the section may be removed by slipping the section endwise from the shaft. The gear 22, together with its sleeve bearing 31, is also capable of axial movement relative to the shaft. In operation, the gear 22 is held against such axial movement by its abutment, on the one hand, with the gear 21, and on the other hand by engagement with a thrust bearing 47 which is interposed between the end of the hub 30 and the inner face of the adjacent bearing 13. This construction permits the gear 22 to be quickly removed and replaced by another gear when it becomes desirable to vary the driving ratio of the device. Moreover, removal of the cover exposes all of the parts for inspection, repair or replacement.

I claim as my invention:

1. A power transmission device comprising, in combination, a drive shaft, a driven shaft, a pair of gears mounted on said driven shaft, one of said gears being fixed to and the other rotatable relative to said driven shaft, means connected with said drive shaft for moving said gears relatively to each other in opposite directions, a member movable between two positions, said relatively rotatable gear and said member having complementary surfaces thereon engageable in one of said positions to prevent rotation of said rotatable gear, said surfaces being angularly formed with respect to the direction in which said rotatable gear tends to rotate whereby to force said member to the other position thereof, a second member engaging said first member in either of said two positions, and resilient means engaging said second member to hold said second member in engagement with said first member and yieldingly to resist movement of said first member from one position to the other.

2. A power transmission device for connecting a driving and a driven shaft comprising, in combination, a housing having a removable cover element enclosing portions of said shafts, a bearing in said cover element for said driven shaft, said cover element being slidable axially of said shaft to remove the element from the shaft, a gear affixed to said driven shaft within said housing, a second gear rotatably mounted on said driven shaft in abutment with said first gear and substantially adjacent the cover element, said second gear being slidable axially from said shaft to permit replacement thereof by another corresponding gear, a thrust bearing interposed between said second gear and the bearing on said cover whereby to hold said second gear against movement axially of the shaft when the parts are assembled, means connected with said driving shaft for effecting relative rotation between said gears, means mounted on said cover element for holding said second gear against movement, and means on the cover element for releasing such engagement when a load in excess of normal is applied to the device.

3. In an underfeed stoker having a conveyer screw and a power source for driving the same, a power transmission for drivingly connecting said power source and said screw comprising a planetary gear system including a normally stationary gear and releasable means for maintaining said gear in such normal condition and for releasing said gear for movement when an excess load is applied to the mechanism, said means comprising an abutment on said gear, a shiftable detent having an active position wherein it has a cam engagement with said abutment to hold said gear against rotation and shiftable to an inactive position by an overload acting through the cam engagement between the detent and said abutment, and a yielding pressed latch operable to hold said detent in either of its positions and shiftable by a force applied to said detent to permit shifting of the detent.

WARREN DEAN BURTON.